March 9, 1943.  G. O. DRIESBACH ET AL  2,313,524
TRAVELING WORK CONVEYER
Filed March 17, 1939  10 Sheets-Sheet 4

INVENTORS
Gilbert O. Driesbach
Robert C. Rahm
BY
Emery, Varney, Whittemore & Dix
ATTORNEYS.

March 9, 1943.　　G. O. DRIESBACH ET AL　　2,313,524
TRAVELING WORK CONVEYER
Filed March 17, 1939　　10 Sheets-Sheet 8

Fig. 11.

INVENTORS
Gilbert O. Driesbach
Robert C. Rahm
BY
Emery, Varney, Whittemore & Dix
ATTORNEYS.

March 9, 1943.  G. O. DRIESBACH ET AL  2,313,524
TRAVELING WORK CONVEYER
Filed March 17, 1939  10 Sheets-Sheet 10

INVENTORS
Gilbert O. Driesbach
Robert C. Rahm
BY
Emery, Varney, Whittemore & Dix
ATTORNEYS Patented Mar. 9, 1943

2,313,524

UNITED STATES PATENT OFFICE 2,313,524

TRAVELING WORK CONVEYER

Gilbert O. Driesbach, Robesonia, and Robert Carl Rahm, Wyomissing, Pa., assignors to S. Liebovitz & Sons Inc., New York, N. Y., a corporation of New York Application March 17, 1939, Serial No. 262,330

9 Claims. (Cl. 38—8)

This invention relates to traveling work conveyers, particularly to a conveyer adapted to carry garments or the like successively to a plurality of stations where successive operations are performed upon them, and has for an object the provision of improvements in this art.

Certain types of garment conveyers have previously been proposed wherein the work traveled continuously. With such conveyers it was necessary for the operators to walk alongside the moving conveyer to work on the garment or other article carried thereby. This was very tiring on the operators; and gave rather inferior or inaccurate results because of the inherent difficulties in working upon moving articles. Constantly moving conveyers are also relatively wasteful of floor space.

According to the present invention the work is moved intermittently from station to station. This permits the operators to stand and keep their working tools in one place, thereby increasing production and very materially reducing their fatigue. Such an arrangement is also conducive of more accurate and neater work because the work is not in motion during the time that operations are being performed upon it and also because it is possible to hold the work supporting surfaces more accurately in position while at rest than while in motion. The station-stop mechanism is also much more economical of floor space than the continuously traveling mechanism. Moreover, it avoids the expense of providing a continuous work support, if this change from the herein illustrated form should be deemed desirable, because substantial supports are required only at the stations and relatively inexpensive simple guides may be used if desired between stations.

In the broad aspect of this invention one of the features is to provide an improved machine for allowing the carrying on of several operations on a product, which involves the employment of a plurality of work stations and improved driving means for moving the work from station to station intermittently and for returning the work carrier from the last station back to the first station.

In the following description the application of the apparatus to ironing shirts will be taken for a specific example.

One of the features of the invention is the provision of separate work surfaces or pads for each article at each station, these work surfaces or pads being continuously and automatically brought from the last work station back into position at the first work station ready for a fresh article to be placed thereon and started on its way to the several work stations where the various desired operations are performed upon it.

Another feature of the invention is the provision of improved means for attaching the work surfaces or pads on the conveyer and assuring that they are accurately placed and held in correct position when stopped.

Another feature of the invention is the provision of improved means for preventing wrinkling or other deformation of the work surfaces or pads when the required operations are being performed on them or when they are being moved by the conveyer.

Another feature of the invention is the provision of improved means for supporting the conveyer relative to the work surface supports and the conveyer driving and guiding mechanism.

Another feature of the invention is the provision of improved means for holding the work or articles on the work supports or pads so they will be held properly while they are being operated upon and also while they are being moved with the work surfaces and the conveyer from one station to another.

Another feature of the invention is the provision of improved means for placing tension on the conveyer.

Another feature of the invention is the provision of improved means for driving the conveyer whereby the articles may be moved rapidly from one station to another but without too rapid acceleration or deceleration such as would tend to displace the work and the work surfaces due to inertia.

Another feature of the invention is the provision of an improved work supporting pad having an envelope and adapted to be quickly assembled and attached on the conveyer.

Another feature of the invention is the provision of side guards for the work surfaces or pads which minimize the droppage through the work support of pins or other articles used in the operations, and which protect the hands of the operators from possible injury.

Other features, objects and advantages of the invention will be obvious to those skilled in the art from the following description of an illustrative embodiment of the invention. This description will be assisted by the accompanying drawings of the illustrative embodiment wherein:

The present apparatus has been designed for finishing shirts ready for packaging. Primarily it is intended to be used in a shirt manufacturing plant for assisting in the ironing, folding and pinning operations which follow the actual manufacturing operations preparatory to packaging the shirts for shipment; but it will be clear that the apparatus may be used for laundries where the same or similar operations are performed on shirts; also that the apparatus in substantially its identical form may be used for other garments, such as pajamas, underwear and the like; and that apparatus of similar forms embodying the invention may be used in connection with the finishing of fabric articles other than apparel.

Figure 1:
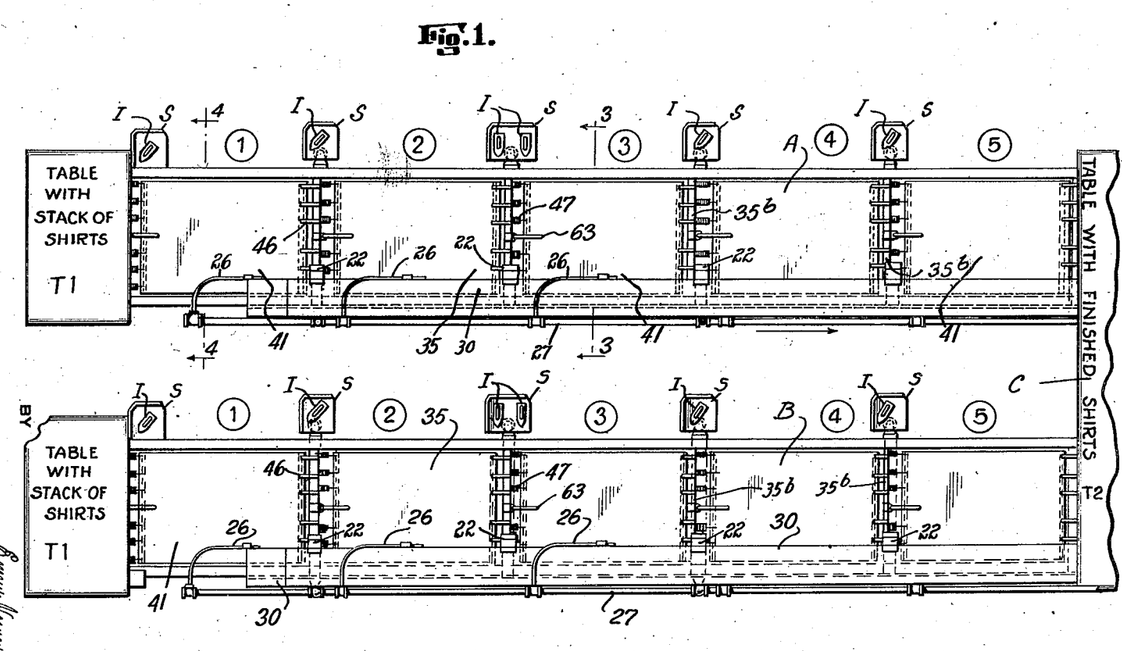
Fig. 1 is a plan view of a dual-type work conveyer embodying the invention.

Considering the apparatus as a finishing unit in a shirt factory, it will aid in understanding the specific form disclosed herein to point out in Fig. 1 that it comprises two work conveyer units which may be generally designated as A and B, operated by driving mechanism C. Shirts are supplied to two feeding tables T1 and finished shirts are placed on the take-off table T2. Each conveyer provides five work stations, one for each operator but it will be understood that this is merely exemplary and that more than one operator may work at a station; that by a different division of operations some of the stations may not be used at times; and that more or less than five stations may be provided. But assuming a division of work on one common type of shirt for five operators, each operator at the five stations, numbered 1, 2, 3, 4 and 5 in circles, may perform the following operations:

Station 1—Places a shirt from table T1 on the conveyer; presses the cuffs which in this form of shirt are already buttoned; turns down the collar; and buttons three buttons on the front.

Station 2—Buttons two more buttons on the front; pins space in collar, lays the shirt out and fastens the collar and skirt or tail to position the shirt in stretched condition with its front upward on the conveyer; and sprinkles the front ready for pressing.

Station 3—Presses the front; unfastens the skirt and swings the shirt over; removes the collar holder and passes it back to the No. 2 station; unfastens the skirt; and presses the back of the shirt.

Station 4—Places the insert board in position; folds one sleeve and presses; folds the other sleeve and presses; puts in two pins to hold sleeves; and turns the skirt up and under.

Station 5—Pins the turned up skirt and cuffs; presses the back; touches up the front; and removes the shirt to the take-off table T2.

Figure 2:
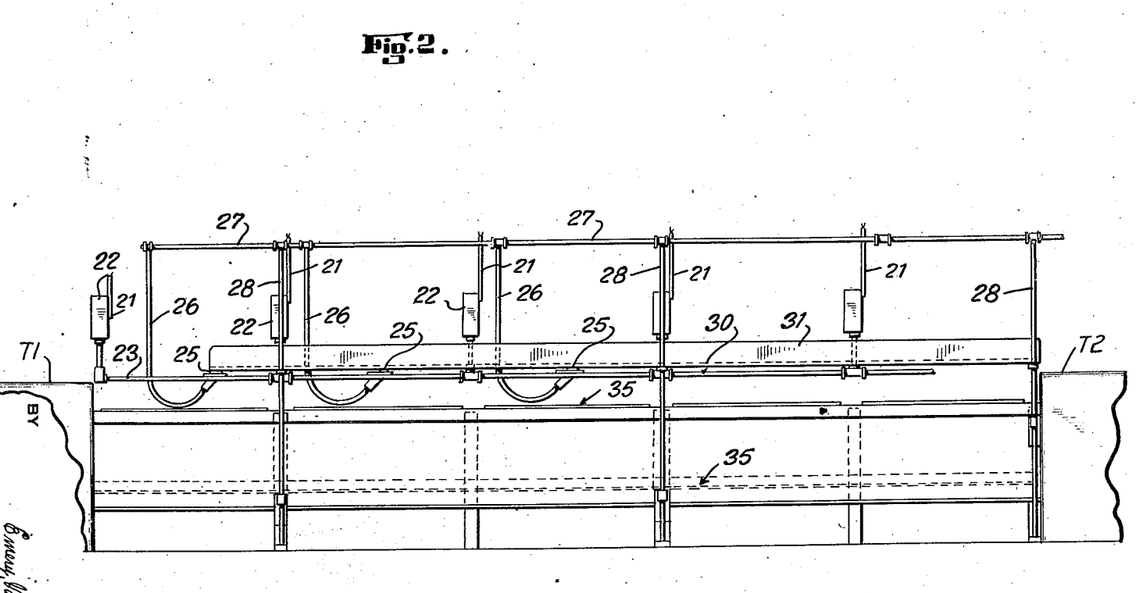
Fig. 2 is a side elevation of one of the conveyers shown in Fig. 1.
Figure 3:
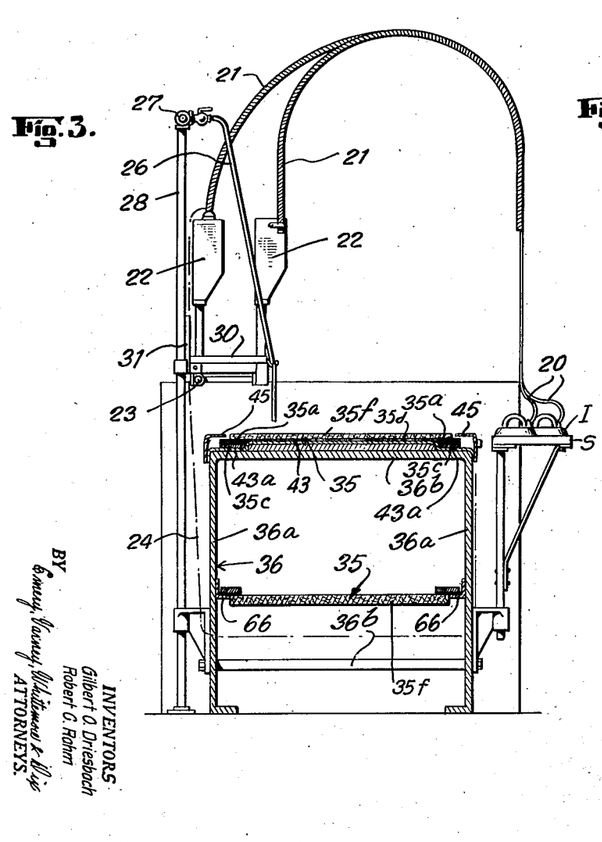
Fig. 3 is a vertical cross section taken on the line 3—3 of Fig. 1.
Figure 4:
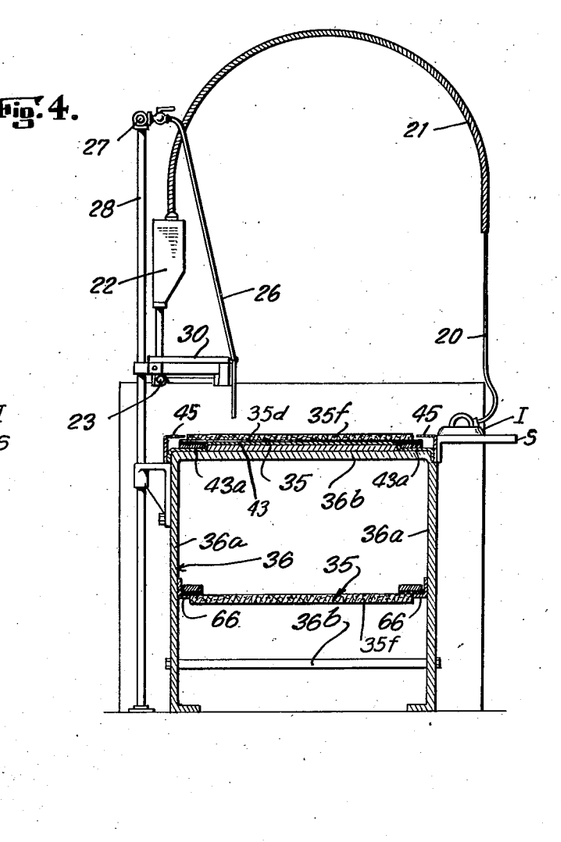
Fig. 4 is a vertical cross section taken on the line 4—4 of Fig. 1.

At each station facilities are provided for such operations as are likely to be performed there. In the specific form illustrated, stands S are provided for holding heated pressing irons I. As noted above, the operator at station No. 3 does an unusual amount of pressing and for this reason is supplied with two irons and a stand large enough to hold them. The irons may be heated by electricity or gas or any other suitable medium. Electric irons are contemplated and as shown in Figs. 2, 3 and 4 the cords 20 extend from spring coils 21 emerging from control or switch boxes 22 connected with electric wires carried in a conduit 23. Where two irons are used at the same station two cords and spring coils may extend across and above the conveyer, or if there is danger of the cords becoming tangled it may be desirable to pass the connections under the conveyer as shown in dotted lines 24 in Fig. 3.

It is also necessary to sprinkle the articles with water, starch solution or the like and for this purpose a suitable number of sprinklers 25 are provided, these being supplied with the sprinkling fluid by flexible tubes 26 from pipe 27. The pipe 27 may be supported by upright pipes 28.

A shelf 30 having a back 31 may be provided on the back side of the conveyer for holding pins and other articles required by the operators.

Obviously the facilities may vary according to the work to be done, those illustrated and described being suitable for the specific work taken for illustration herein.

Coming now to the conveyer mechanism itself, it may be seen in Figs. 3 and 4 that the conveyer 35 is supported by a stand or frame 36 comprising suitable uprights 36a and cross members 36b.

Figure 7:
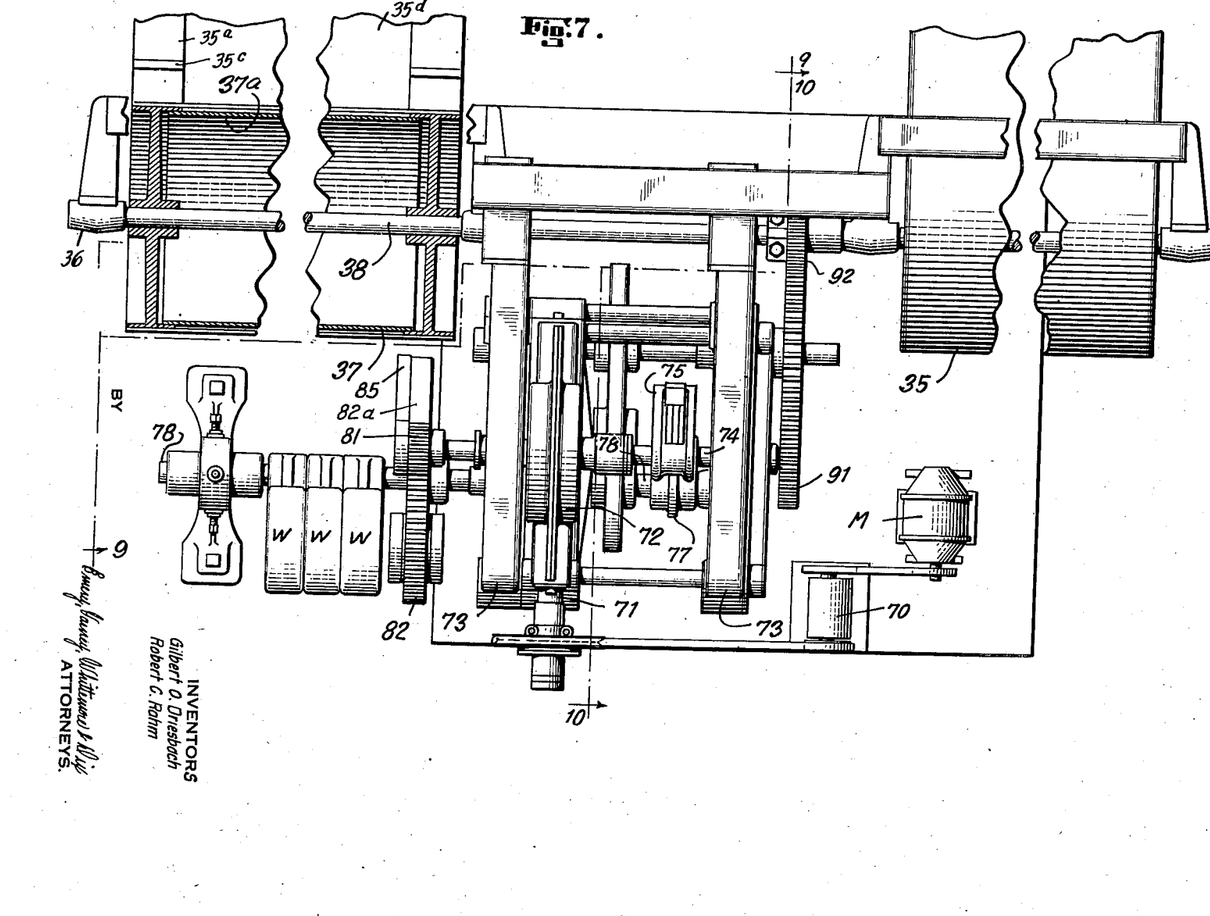
Fig. 7 is an enlarged plan view, partly in section, showing conveyer driving apparatus, the view being a continuation of the right end of Fig. 1.
Figure 8:
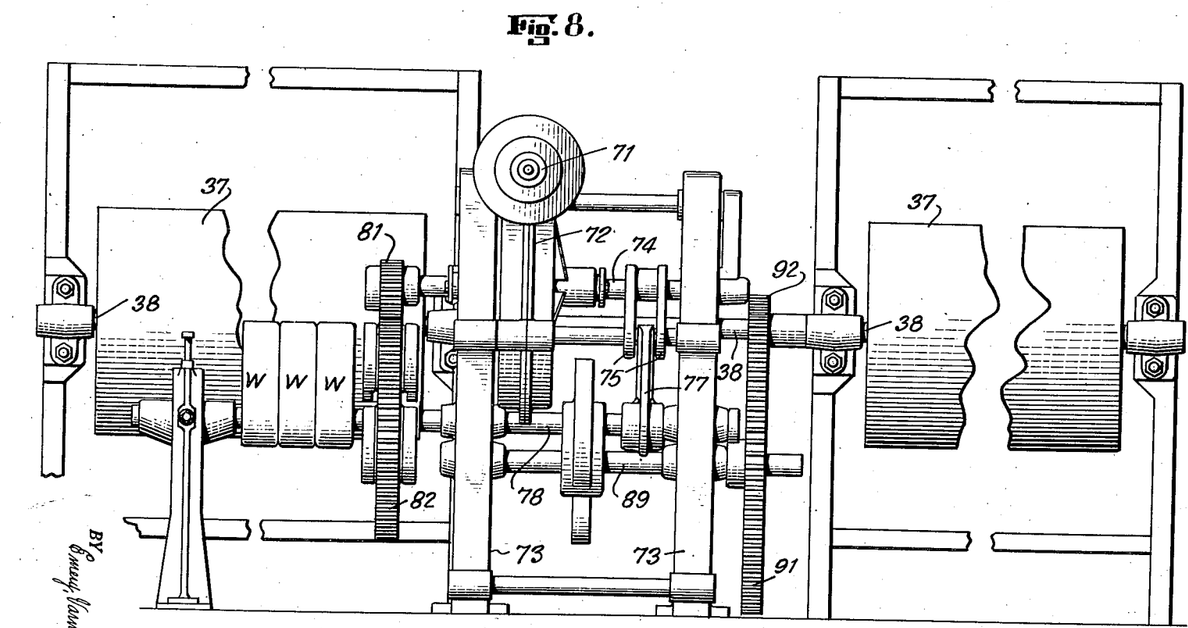
Fig. 8 is an end elevation of the parts shown in Fig. 7.

As shown in Figs. 7, 8, 9 and 10 the conveyer 35 is formed as an endless belt passing over drums 37 at each end. Figs. 7 to 10 clearly show the drums at the driving end of the apparatus. The drums 37 at the other end of the apparatus are most clearly shown in Figs. 11 and 12. As shown at the left of Fig. 7, the driving drum is mounted upon and operated by a driving shaft 38 supported in the frame 36 and driven by mechanism which will be described hereinafter.

Figure 5:
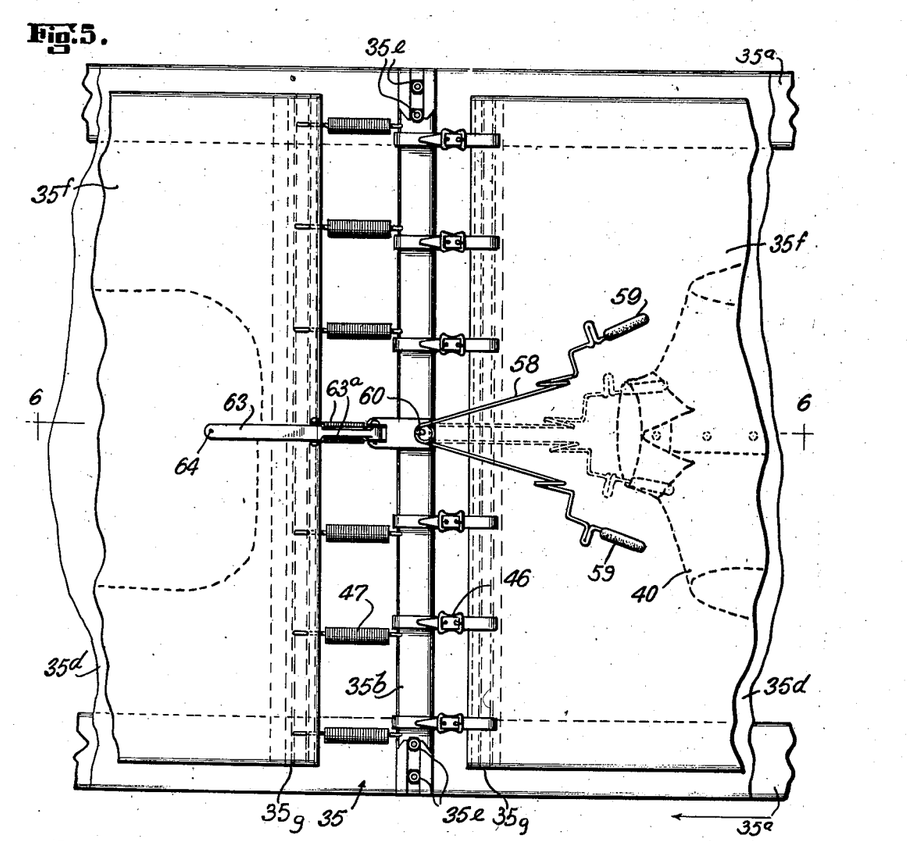
Fig. 5 is an enlarged partial top plan view showing how a garment is held on the conveyer.
Figure 6:
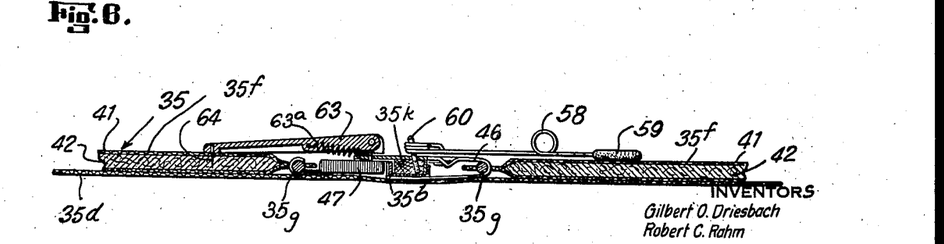
Fig. 6 is a vertical longitudinal section taken on the line 6—6 of Fig. 5.

The conveyer 35 comprises tension belts 35a on each side spaced apart by cross bars 35b. On the ends of the members 35b there are fastened fiber blocks to avoid noise when the conveyer is guided along its ways and to take up wear when the conveyer runs upside down on its lower span beneath the table. To insure positive drive between the conveyer and its drums whereby to avoid slippage and preserve a predetermined stopping position of given portions of the conveyer at the stations, the side belts 35a are provided with driving cleats 35c engaging recesses 37c on the periphery of the drums. The conveyer also comprises a sheet of fabric 35d such as canvas which protects the articles from being soiled by the machinery and prevents pins, etc., from dropping through the conveyer. In Fig. 6 it may be seen that the bars 35b are U-shaped in cross section with their flanges extending upward away from the table, and in Fig. 5 it may be noted that the bars 35b are attached to the side belts 35a by bolts 35e whereby they may be quickly removed for replacement of the convas protecting sheet therebeneath. A wooden filler 35k is secured in the U-shaped cross bar. It may extend all the way between the side belts or only part way in the center where the garment anchors, later to be described, are located. It may also be noted in Fig. 5 that the side flanges of the cross bars 35b are cut through on an angle near their ends above the side belts 35a, and that the short outer ends of the side flanges are bent down upon the back portion which is secured to the side belts.

The conveyer also comprises and carries a plurality of work supporting surfaces or pressing pads 35f upon which the articles are disposed for the required operations. In Fig. 5 a shirt 40 is shown in the stretched out position in which it is held on the pad for pressing operations.

As shown in Fig. 6 the pads 35f comprise an envelope 41 holding a filler 42. The envelope may be of a material such as canvas and the filler may be of hair felt or the like which may be removed when the envelope is laundered. The pad thus made is semi-flexible so as to pass around the drums without retaining permanent wrinkles yet is sufficiently rigid to provide a good ironing surface free from wrinkling when suitably backed up by a supporting surface. A satisfactory supporting surface may be provided, as shown in Figs. 3 and 4, by a heavy metal table 43 secured to the top of the frame 36. The table may be provided with stiffening reinforcement, if desired, and may be continuous from one end of the conveyer frame to the other or may be discontinuous between stations if suitable guides are there provided for the conveyer. The table herein illustrated is continuous.

The table 43 is raised at the center to smoothly support the work pads and depressed on each side as at 43a to receive the side belts 35a and cleats 35c without obstruction to the upper surface. The side belts and cleats cooperate with the offset portion of the table to provide a lateral guide for the conveyer. This prevents the conveyer and work from being displaced sideways no matter what forces the operator may place thereon during pressing or other operations.

While looking at Figs. 3 and 4 it may be observed that the frame is provided with side flanges 45 which overhang the side belts 35a and closely confine the side edges of the pads 35f so as to close the space through the conveyer and reduce lateral displacement of the pads during operations. This also protects the hands and clothing of the operators and the articles being processed from coming into contact with the rougher parts of the conveyer. This reduces likelihood of injury.

The pads are carried along the table in stretched out position between the cross bars 35b. This prevents the pads from dropping down on their return trip under the table. The pads are preferably resiliently held so they may yield when passing over the end drums 37. Here it may be observed by reference to Fig. 7 that the central portion 37a of the drum is depressed below the outer portions to provide easy movement of the pads around the drums.

The preferred means for securing the pads to the conveyer (shown in Figs 5. and 6) comprises buckle straps 46 which detachably connect the forward end of the pads to the leading bar 35b and spring hooks 47 which detachably connect the rear ends of the pads to the trailing bars 35b. This means insures that the pads will always arrive at the stations in correct position even if they have been displaced at a previous station.

The provision of a plurality of straps and springs across the width of the pad insures that it will be held straight. As a further aid in keeping the pads straight and smooth, rigid equalizing cross-rods 35g (Figs. 5 and 6) are secured in the ends of the pad envelopes 41, and the straps 46 and springs 47 are secured to and preferably around these equalizing rods.

Figure 12:
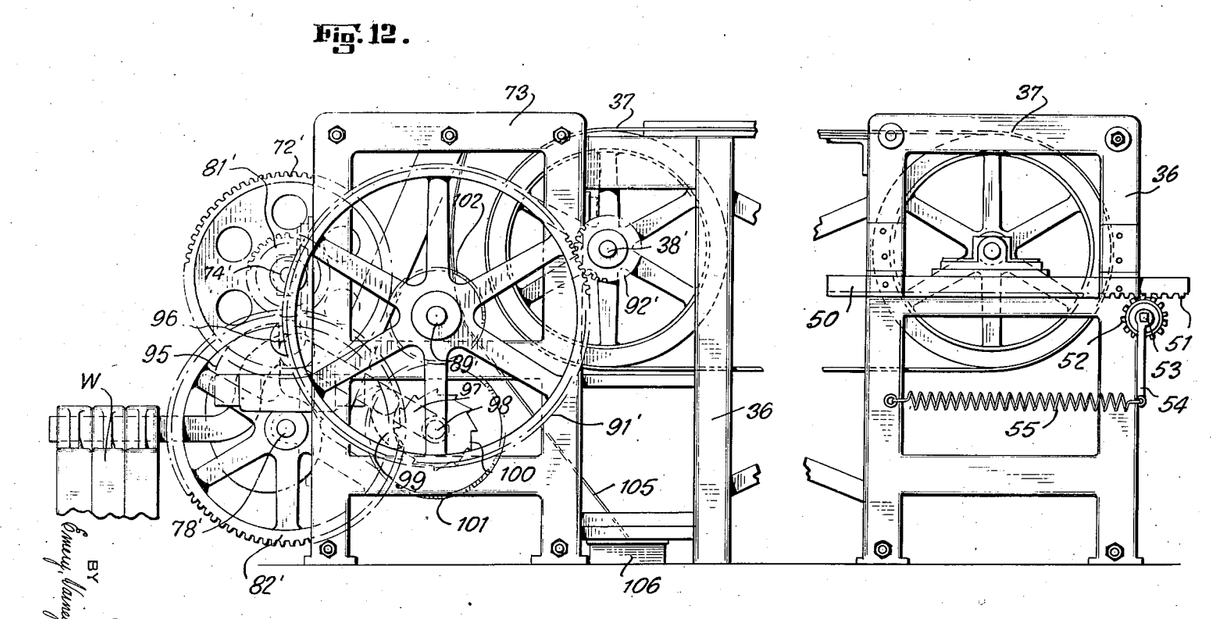
Fig. 12 is a side elevation of the apparatus shown in Fig. 11.

The means for tensioning the belt is shown at the right of Fig. 12. Here it may be seen that the drum 37 at this end is mounted on slides 50 provided with racks 51 meshing with pinions 52 on a shaft 53. An arm 54 and a spring 55 rotate the shaft and pinions and through the rack and slides cause the drum 37 at this end to move away from the drum at the other end whereby to put the conveyer under tension.

It is to be noted that when tension is placed on the side belts this tends to pull the cross bars above the top of the table apart and thus to stretch out the pads between the bars. And this will be true regardless of the fact that the pads may be substantially free of tension as they pass over the end drums.

The shirt may be held at the front end by a spring clip 58 provided with rubber covered fingers 59 which are sprung into engagement with the inside of the shirt collar. The clip is carried on a post 60 secured in the middle portion of the filler 35k of the cross bar 35b. Other types of shirts may require different types of clips but any of them may be readily slipped on the post 60 ready for use.

The skirt or tail of the shirt may be held after the shirt is stretched out from the clip 58, by a hinged clamp 63 held down by pressure of springs 63a (Figs. 5 and 6) and provided with a pointed pin 64 adapted to stick through the shirt and enter the resilient pad. The clamp is also hinged to a cross bar and in line with the clip 58 so as to keep the tension straight along the conveyer. The resilient action also prevents the clamp from hanging down to obstruct movement when it is upside down on the lower span of the belt under the table. If desired, a plurality of clips may be employed for the shirt, or for any product or article that is being operated upon.

As shown in Figs. 3 and 4, the conveyer returns under the table upon longitudinal side tracks 66. The side belts ride upon these tracks, leaving the central portion of the conveyer in the region of the pads free from wear and soilage.

The articles, as thus supported and at times held on the conveyer, may be moved from station to station without displacement relative to the conveyer if the driving means is of the proper character. And the matter of avoiding injury to the operators is a paramount consideration. Ample time is allowed for the completion of operations at all stations, whereupon a warning signal is given and the conveyer moves forward to the next station. This permits the operators to remove pressing irons and the like from the conveyer and stand clear of it during movement. The conveyer may present considerable inertia against starting, due to large frictional contact on the table, but preferably the driving motor will be as small as possible. This not only avoids the presence of excessive power which might injure the operators or the apparatus in case of an accident but also saves power costs. What is desired is a relatively easy start with rapid acceleration and rapid deceleration with a gentle stop. Also the stop must be in an accurate predetermined position. This may be provided by the driving mechanism illustrated herein.

Referring to Figs. 7 to 10 showing the first form of driving apparatus, it may be observed that a motor M through speed change gear mechanism 70 drives a shaft 71 of speed reduction gear mechanism 72. As a safety measure to prevent injury to the operators as well as the mechanism, slippage in the drive under predetermined tension is provided. This may comprise a slip disk arrangement built into the shaft 71 or between the shaft and the pulley thereon. The driving mechanism is supported in a frame 73 placed at one end on a line between the conveyers. A shaft 74 is driven by the gear mechanism 72, this shaft rotating continuously. It carries arms 75 having a pin 76 at the outer end adapted to cooperate with an end slotted arm 77 secured to a shaft 78.

At its end on the other side of the speed reduction mechanism, the shaft 74 carries a gear 81 meshing with a skip gear 82 fast on the shaft 78. The gear 82 has a blank sector 82a free of teeth where it may have free movement with respect to the drive gear 81. Pilot members 84 and 85 on the shafts 74 and 78 respectively serve to reestablish proper meshing engagement between the gears 81 and 82. In this embodiment the shaft 78 carries weights W which are raised to store power while the gears 81 and 82 are in mesh and which fall to provide supplementary driving power when the gears 81 and 82 are out of mesh, that is, when the blank space 82a reaches the gear 81. This coincides with the time when the conveyer is moved forward by suitable intermittent movement or escapement mechanism.

This escapement mechanism comprises a Geneva arm 86 fast on shaft 78 and carrying a pin 87 cooperating with a Geneva star wheel 88 fast on shaft 89. The shaft 78 is also provided with a holding disk 90 cooperating with the star wheel 88 and the pin 87 to control the escapement movement, the disc forming a part of the Geneva gear. The shaft 89 is provided with gears 91 meshing with and driving the gears 92 fast on the drum shaft 38.

Figure 9:
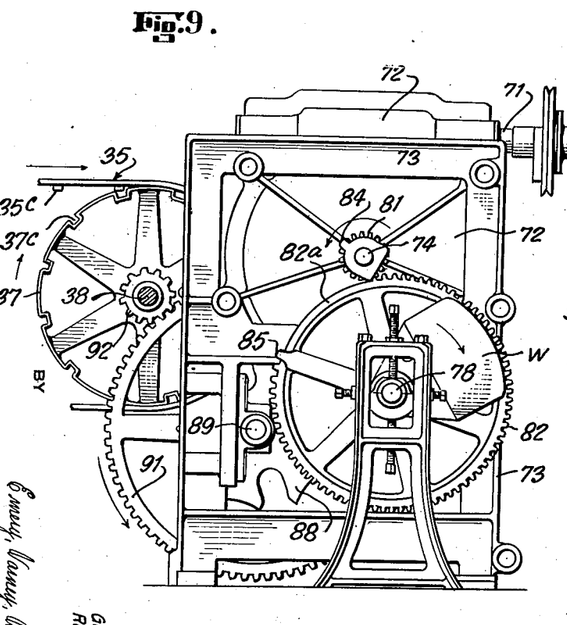
Fig. 9 is a vertical section taken on the line 9—9 of Fig. 7.
Figure 10:
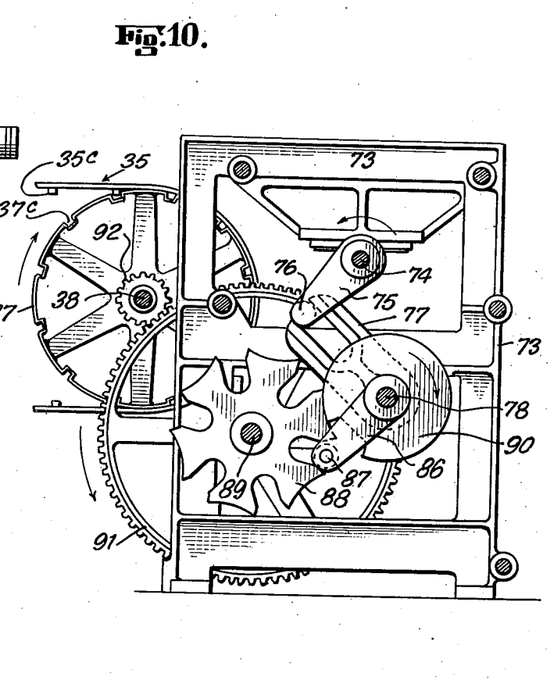
Fig. 10 is a vertical section taken on the line 10—10 of Fig. 7.

By comparing Figs. 9 and 10 it will be seen that while the motor driven shaft 74 is raising the weights W and carrying them over top dead center, the gear 81 is in mesh with the gear 82 of shaft 78; but during this time the arm 75 of the shaft 74 is not driving the arm 77 of the shaft 78. Also that the concentric portion of notched Geneva disk 90 is moving around in one of the concave arcuate recesses of the Geneva star wheel 91 so that the Geneva shaft 89 and the conveyer are not driven but are held in predetermined or index position. In this position the pads are accurately located in working position at the several stations.

The position of release at the beginning of conveyer movement is depicted in Figs. 9 and 10. At this time the weights become effective on the shaft 78 and also the arm 75 becomes effective on the arm 77 of the shaft 78. These arms provide a slow start and stop with rapid acceleration and deceleration free of the action of the gears 81 and 82 which is a uniform speed driving action. Since the Geneva gear mechanism has a similar action and since they are arranged in series, their combined action will produce an accentuated acceleration and deceleration, though smooth in action and free from jerks.

It is thus seen that this driving mechanism gives an intermittent action of the desired type while at the same time the mechanism is relatively simple and inexpensive. It permits of the use of a very small motor which is economical of power and not likely to produce serious damage in case of an accident.

Figure 11:
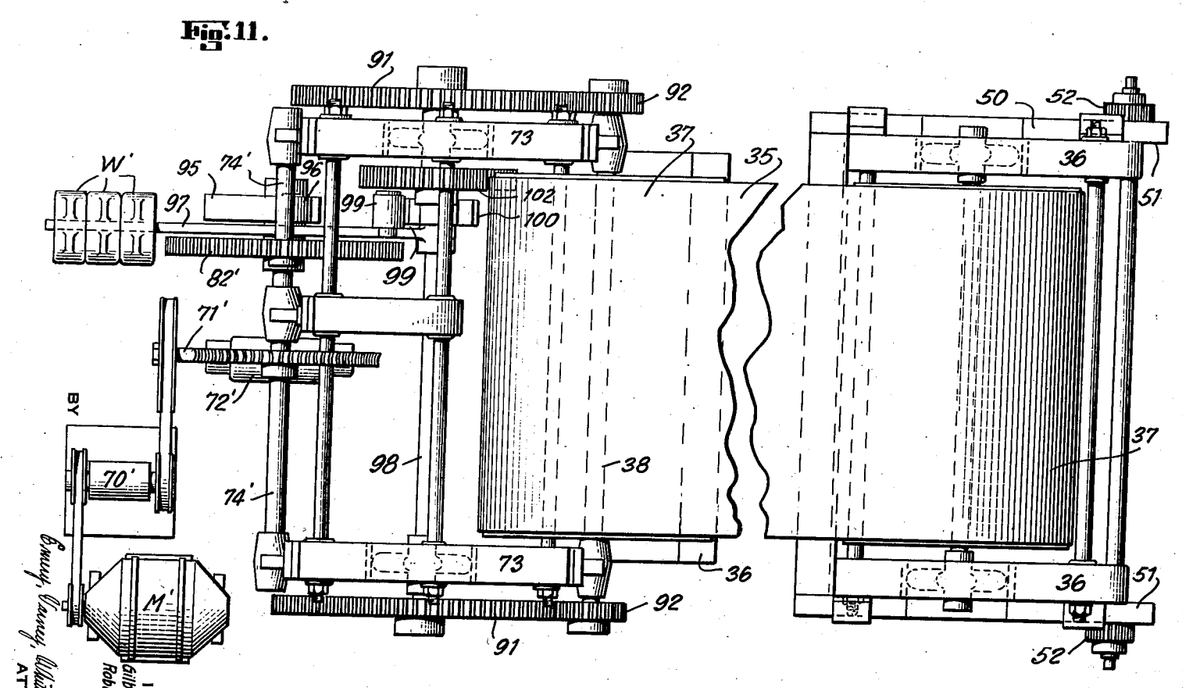
Fig. 11 is a plan view of another embodiment of driving apparatus, the view also showing at the right end certain conveyer tension mechanism which may be used with any of the embodiments.

In Figs. 11 and 12 a modified form of driving mechanism is shown. This comprises a motor M′, change speed gear mechanism 70′, shaft 71′ of speed reduction gear mechanism 72′, a shaft 74′ driven by the gear mechanism, a gear pinion 81′ on the shaft 74′, a large gear 82′ meshing therewith, and a shaft 78′ on which the gear 82′ is secured. At this point this form of mechanism begins to vary from that shown in Figs. 7 to 10. The shaft 78′ carries fast thereon a cam 95 having a gradual rise and a sudden drop. In its rotation the cam raises a cam follower 96 secured to an arm 97 pivoted on a ratchet shaft 98 and carrying weights W′ at its outer end. The arm 97 is provided with a pawl 99 cooperating on its downward movement with a ratchet 100 and thereby driving the shaft 98. The shaft 98 carries a gear 101 meshing with a gear 102 fast on a shaft 89′. The shaft 89′ carries a gear 91′ meshing with a gear 92′ fast on the drum shaft 38′.

In this form of mechanism the drive of the conveyer is effected entirely by the weights W′. These act slowly through the action of gravity at the start and increase in speed as they drop. If desired, the end of the drop may be cushioned by springs, dashpots, or other suitable buffers.

In Fig. 12 it is to be noted that a catch guard 105 and a catch pan 106 are provided at the offtake end of the conveyer for collecting pins, etc., which may be left on the conveyer.

Figure 13:
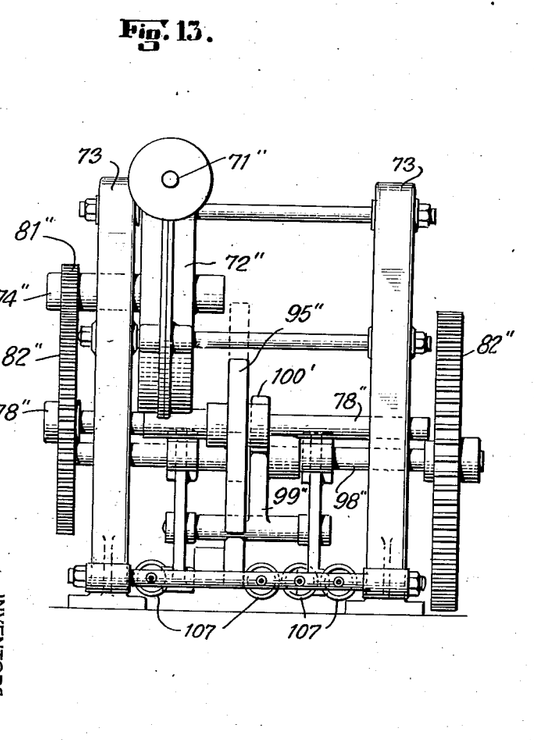
Fig. 13 is a partial end elevation of another embodiment of driving apparatus.
Figure 14:
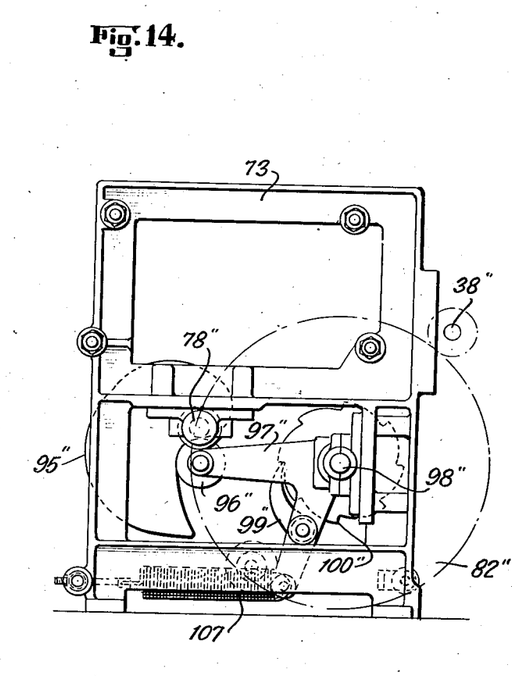
Fig. 14 is a side elevation of Fig. 13.

In Figs. 13 and 14 a second modification of driving mechanism is shown. This comprises a shaft 71″, a speed reduction gear 72″, a shaft 74″ driven by the speed reduction gearing, a gear pinion 81″ on the shaft 74″, a large gear 82″ meshing therewith, and a shaft 78″ on which the gear 82″ is secured. The shaft 78″ carries fast thereon a cam 95″ acting upon a cam follower 96″ secured to an arm 97″ pivoted on a ratchet shaft 98″. An extension of the arm 97″ carries a pawl 99″ cooperating with a ratchet 100″ on the ratchet shaft 98″. In this form of mechanism, a plurality of springs 107 instead of weights serve to deliver the stored up power for moving the conveyer.

This form may not provide as smooth starting and stopping as the other forms but the frictional resistance of the conveyer and related parts will serve to ease the start somewhat and buffers, etc., may be provided for easing the stop.

The operation of the device will be apparent from the foregoing description. It will be seen that the apparatus provides a conveyer and supports therefor at the stations which are convenient for the operators; which minimizes their fatigue; which is conducive to accurate neat work; and which avoids the likelihood of injury or accidents to the operators, articles or the apparatus itself. The work supporting surfaces are of a simple, convenient and inexpensive nature and permit the necessary operations thereon with the maximum resistance to disorganization or displacement; which readily resume their proper positions if they do become displaced; and which are not readily subject to injury in use or while passing over the conveyer drums. Both the conveyer and the work supports are kept under suitable operating tension at all times. The work supporting surfaces or pads are readily removable and are so made that they may be quickly taken apart for cleaning. The means for holding the articles on the conveyer are simple and provide quick easy attachment of the article. The holding means may be quickly removed and replaced by other types.

The pads individually may be removed from the conveyer whenever desired. It is thus possible to operate with any number of pads desired because the presence or absence of the pads on the conveyer in no way affects the usual functioning of the machine.

Moreover, the conveyer driving means is of a simple and inexpensive nature, well calculated to produce the desired intermittent movement of the conveyer between stations without using excessive power; which accurately stops and holds the work at the stations; which moves the conveyer with the least possibility of displacing the work disposed thereon and without danger of serious injury to the operators; and which in general, with the other parts of the apparatus constitutes a distinct improvement in the art.

While the invention has been described by reference to specific embodiments, it is to be understood that the invention may have other embodiments within the limits of the prior art and the scope of the subjoined claims.

We claim:

1. A traveling work conveyer adapted for use in finishing operations on shirts or the like, comprising in combination, a work table, a conveyer belt movable along said table, and a plurality of work supporting pads secured in spaced relation on said conveyer belt, said pads each being secured in stretched condition by means securing its ends to fixed anchorages on said conveyer belt to leave each pad independent of each other pad, said securing means comprising resilient stretching means at one end of the pad.

2. A traveling work conveyer adapted for use in finishing operations on shirts or the like, comprising in combination, a work table, a conveyer belt movable along said table, and a plurality of work supporting pads secured in spaced relation on said conveyer belt, said pads being removably secured at their ends to fixed anchorages on said conveyer belt to leave each pad independent of each other pad, the means for securing the pad comprising removable straps at one end and removable springs at the other end.

3. A traveling work conveyer adapted for use in finishing operations on shirts or the like, comprising in combination, a work table, a conveyer belt movable along said table, spaced fixed anchorages on said belt providing a space for articles to be stretched out therebetween to be operated upon, and article holders at said anchorages, one holder comprising a clamp hinged to an anchorage for vertical movement and resiliently pressed toward said belt to grip the article beneath it.

4. A traveling work conveyer adapted for use in finishing operations on shirts or the like, comprising in combination, a work table, a conveyer belt movable along said table, spaced anchorages on said belt, work pads secured at their ends in stretched condition between said spaced anchorages, and holders secured to said anchorages for holding the work in stretched position on said pads, the leading holder comprising a post carried by an anchorage and an article securing member adapted to be slipped on said post, and the trailing holder comprising a movable clamp resiliently pressed toward the pad for engaging the work thereagainst.

5. A traveling work conveyer adapted for use in finishing operations on shirts or the like, comprising in combination, a work table, a conveyer belt movable along said table, rigid cross-bars secured at spaced intervals to said belt, work pads disposed between said cross-bars, a plurality of straps securing a pad at one end to a cross-bar, a plurality of resilient members securing the pad to an adjacent cross-bar, a clip removably secured to a post on the leading cross-bar for holding one end of the work on the pad, and a spring clamp secured to the following cross-bar for holding the other end of the work on the pad.

6. A traveling work conveyer adapted for use in finishing operations on shirts or the like, comprising in combination, a work table, a conveyer belt movable along said table, rigid cross-bars secured to said belt at spaced intervals, said cross-bars being U-shaped in cross section with the back of the section secured to the conveyer belt, work pads disposed between said cross-bars, and a plurality of members connecting the end of each pad to a flange of an adjacent cross-bar.

7. A traveling work conveyer adapted for use in finishing operations on shirts or the like, comprising in combination, a work table, a conveyer belt including spaced longitudinal belt members at each side of the table and spaced rigid cross-bars secured at their ends to the side belt members, said table providing longitudinal guides for said side belt members, longitudinal flanges overhanging said side belt members from their outer edges, and pads secured to said cross-bars and fitting closely to the edges of said overhanging flanges.

8. A traveling work conveyer adapted for use in finishing operations on shirts or the like, comprising in combination, a work table, a conveyer belt including spaced longitudinal belt members at each side of the table and spaced rigid cross-bars secured at their ends to the side belt members, said table providing longitudinal guides for said side belt members, longitudinal flanges overhanging said side belt members from their outer edges, and pads secured to said cross-bars and fitting closely to the edges of said overhanging flanges, the side guides being depressed to place the tops of the side belt members at about the level of the intermediate working portion of the table, and the edges of the pads and flanges meeting intermediate the width of the side belt members.

9. A traveling work conveyer adapted for use in finishing operations on shirts or the like, comprising in combination, a work table, driving drums at the ends of said table, a conveyer belt including spaced longitudinal belt members at each side of the table and spaced rigid cross-bars secured at their ends to the side belt members, and work pads secured by their ends in stretched condition between adjacent cross-bars, said drums being depressed in the central portions to receive said pads and relieve tension on them while passing around the drums.

GILBERT O. DRIESBACH.
ROBERT CARL RAHM.